(12) United States Patent
Claussen et al.

(10) Patent No.: US 12,095,825 B2
(45) Date of Patent: Sep. 17, 2024

(54) SYSTEM AND METHOD FOR EVALUATING A CUSTOMER PREMISE EQUIPMENT (CPE) DEVICE

(71) Applicant: Charter Communications Operating, LLC, St. Louis, MO (US)

(72) Inventors: David Claussen, Evergreen, CO (US); Matthew Petersen, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 195 days.

(21) Appl. No.: 17/176,014

(22) Filed: Feb. 15, 2021

(65) Prior Publication Data
US 2022/0263872 A1 Aug. 18, 2022

(51) Int. Cl.
*H04L 9/40* (2022.01)
*H04L 12/28* (2006.01)

(52) U.S. Cl.
CPC ........ *H04L 63/306* (2013.01); *H04L 12/2801* (2013.01); *H04L 63/1408* (2013.01)

(58) Field of Classification Search
CPC .......... H04L 63/306; H04L 12/2801; H04L 63/1408
USPC ........................................................ 726/22
See application file for complete search history.

(56) References Cited

U.S. PATENT DOCUMENTS

| | | | |
|---|---|---|---|
| 7,802,287 B2 | 9/2010 | Bialk et al. | |
| 8,619,630 B2 | 12/2013 | Riley et al. | |
| 8,750,710 B1 * | 6/2014 | Hirt | H04B 10/25759 398/9 |
| 8,837,302 B2 | 9/2014 | Basile et al. | |
| 10,320,340 B1 * | 6/2019 | Pratt | H03M 1/183 |
| 2002/0182254 A1 * | 12/2002 | Calias | A61K 9/1617 424/94.1 |
| 2005/0163249 A1 * | 7/2005 | McCallister | H03H 21/0012 375/296 |
| 2008/0010512 A1 * | 1/2008 | Riggsby | H04N 21/40 375/E7.025 |
| 2008/0159256 A1 * | 7/2008 | Faska | H04L 49/351 370/349 |

(Continued)

FOREIGN PATENT DOCUMENTS

| | | | | |
|---|---|---|---|---|
| CN | 104754423 A | * | 7/2015 | ......... H04N 21/2383 |
| JP | 2019220978 A | * | 12/2019 | ........... G02F 1/0123 |

(Continued)

OTHER PUBLICATIONS

Chen et al., "Architectural alternatives of wireless access through hybrid fiber/coax distribution plant," Proceedings of GLOBECOM '95, 1995, pp. 972-976 vol. 2, doi: 10.1109/GLOCOM.1995.502549. (Year: 1995).*

(Continued)

*Primary Examiner* — Peter C Shaw
(74) *Attorney, Agent, or Firm* — THE MARBURY LAW GROUP, PLLC

(57) ABSTRACT

Systems and methods for evaluating a customer premise equipment (CPE) device. A network element management system may send an alteration request to a configurable coaxial tap that includes a radio frequency modulator-demodulator combination. The alteration request include information that causes the configurable coaxial tap to directly examine packets that are sent to or received from the CPE device.

18 Claims, 11 Drawing Sheets

(56) References Cited

U.S. PATENT DOCUMENTS

| | | | | |
|---|---|---|---|---|
| 2008/0170502 | A1* | 7/2008 | Benton | H04L 67/125 370/235 |
| 2009/0141634 | A1* | 6/2009 | Rothstein | H04L 47/2483 370/236 |
| 2010/0042573 | A1* | 2/2010 | Wenig | G06F 9/54 709/202 |
| 2013/0232537 | A1* | 9/2013 | Montojo | H04Q 11/0067 725/129 |
| 2015/0029946 | A1* | 1/2015 | Luna | H04L 69/08 370/329 |
| 2016/0112734 | A1* | 4/2016 | Williams | H04H 20/78 725/118 |
| 2016/0227372 | A1* | 8/2016 | Marshall | H04W 4/029 |
| 2019/0020430 | A1* | 1/2019 | Finkelstein | H04L 1/0002 |
| 2019/0109608 | A1* | 4/2019 | Padden | H04B 1/1027 |
| 2019/0326860 | A1* | 10/2019 | Jin | H04B 1/0458 |

FOREIGN PATENT DOCUMENTS

| | | | | |
|---|---|---|---|---|
| WO | WO-2010041295 A1 * | 4/2010 | | H04B 7/155 |
| WO | WO-2017155634 A1 * | 9/2017 | | A61B 5/0507 |
| WO | WO-2018204237 A1 * | 11/2018 | | H04L 43/04 |

OTHER PUBLICATIONS

Buendía et al., "A Smart Cable Offering Selective and Distributed Antenna Radiation Using RF Switches and Non-Conventional Hybrid Couplers," in IEEE Transactions on Antennas and Propagation, vol. 66, No. 11, pp. 6346-6351, Nov. 2018, doi: 10.1109/TAP.2018. 2863753. (Year: 2018).*

Shiyong et al., "Network monitoring in broadband network," Proceedings of the Second International Conference on Web Information Systems Engineering, Kyoto, Japan, 2001, pp. 171-177 vol. 2, doi: 10.1109/WISE.2001.996749. (Year: 2001).*

Qadeer et al., "Network Traffic Analysis and Intrusion Detection Using Packet Sniffer," 2010 Second International Conference on Communication Software and Networks, Singapore, 2010, pp. 313-317, doi: 10.1109/ICCSN.2010.104. (Year: 2010).*

Portoles-Comeras et al., "Monitoring wireless networks: performance assessment of sniffer architectures," 2006 IEEE International Conference on Communications, Istanbul, Turkey, 2006, pp. 646-651, doi: 10.1109/ICC.2006.254780. (Year: 2006).*

Kaneda, "Optimizing Optical Interconnects: Digital Predistortion and Postequalization Techniques in Optical Communications," in IEEE Microwave Magazine, vol. 20, No. 5, pp. 98-114, May 2019, doi: 10.1109/MMM.2019.2898023. (Year: 2019).*

Hussein et al., "LUT/Parametric Digital Predistortion Approach for the Linearization of Power Amplifiers Characteristics," 2008 38th European Microwave Conference, Amsterdam, Netherlands, 2008, pp. 571-574, doi: 10.1109/EUMC.2008.4751516. (Year: 2008).*

Haider et al., "Predistortion-Based Linearization for 5G and Beyond Millimeter-Wave Transceiver Systems: A Comprehensive Survey," in IEEE Communications Surveys & Tutorials, vol. 24, No. 4, pp. 2029-2072, Fourthquarter 2022, doi: 10.1109/COMST.2022. 3199884. (Year: 2022).*

Stockman et al., "Fiber to the Tap: Pushing Coaxial Cable Networks to Their Limits," in IEEE Communications Magazine, vol. 57, No. 8, pp. 34-39, Aug. 2019, doi: 10.1109/MCOM.2019.1800850. (Year: 2019).*

Wolf et al., "Low complexity equalization for cable modems," ISCAS '98. Proceedings of the 1998 IEEE International Symposium on Circuits and Systems (Cat. No.98CH36187), Monterey, CA, USA, 1998, pp. 522-524 vol. 5, doi: 10.1109/ISCAS.1998. 694580. (Year: 1998).*

Andalibi et al., "A Fast-Converging Equalizer for Upstream DOCSIS Channels," in IEEE Transactions on Broadcasting, vol. 56, No. 3, pp. 311-320, Sep. 2010, doi: 10.1109/TBC.2010.2049606. (Year: 2010).*

* cited by examiner

SYSTEM AND METHOD FOR EVALUATING A CUSTOMER PREMISE EQUIPMENT (CPE) DEVICE

BACKGROUND

A theft of service (ToS) attack is a cyberattack in which a person or entity obtains access to a resource or service (e.g., bandwidth, network access, Internet Protocol (IP) services, etc.) without lawfully compensating the service provider for the use of those resources or services. Increasingly, ToS attacks are being perpetuated by nefarious actors through a variety of different types of unauthorized or illegitimate devices, such as rogue modems, orphan modems, cloned modems, persistent duplicate MAC addresses, etc. These unauthorized or illegitimate devices may cause network congestion and/or consume a significant amount of limited network resources (e.g., network bandwidth, etc.) without compensating the service provider for the use of those resources. In addition, these unauthorized or illegitimate devices are increasingly used by hackers, thieves, organized fraud rings, and other nefarious actors to launch cyber-attacks, gain remote control of devices, steal private or sensitive information, hide their true identities, or engage in other malicious activities. Accordingly, new and improved solutions that better identify and respond to unauthorized or illegitimate devices will be beneficial to internet service providers and the consumers of their services.

SUMMARY

The various aspects include method of evaluating a customer premise equipment (CPE) device, which may include receiving an alteration request in a configurable coaxial tap that includes a radio frequency modulator-demodulator combination and evaluating the CPE by the configurable coaxial tap directly examining packets that are sent to or received from the CPE device in response to the configurable coaxial tap receiving the alteration request. Some aspects may include performing, by the configurable coaxial tap, packet sniffing operations to intercept packets that are sent to or received from the CPE device. Some aspects may include demodulating, by the configurable coaxial tap, intercepted packets and storing the results in a memory. Some aspects may include decoding, by the configurable coaxial tap, demodulated packets and read data over cable service interface specification (DOCSIS) and Ethernet frames. Some aspects may include remodulating the packets and sending the remodulated packets to at least one or more of a home network that includes the CPE or a cable modem termination system (CMTS). In some aspects, sending the remodulated packets to at least one or more of the home network that includes the CPE or the CMTS may include determining whether to send the remodulated packets to the home network or to the CMTS based on traffic flow and sending the remodulated packets the home network or to the CMTS based on a result of the determination.

Further aspects may include a computing device or system (e.g., a configurable coaxial tap, etc.) having a processor configured with processor-executable instructions to perform various operations corresponding to the methods discussed above. Further aspects may include a non-transitory processor-readable storage medium having stored thereon processor-executable instructions configured to cause a computing device processor to perform various operations corresponding to the method operations discussed above. Further aspects may include a computing device having various means for performing functions corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
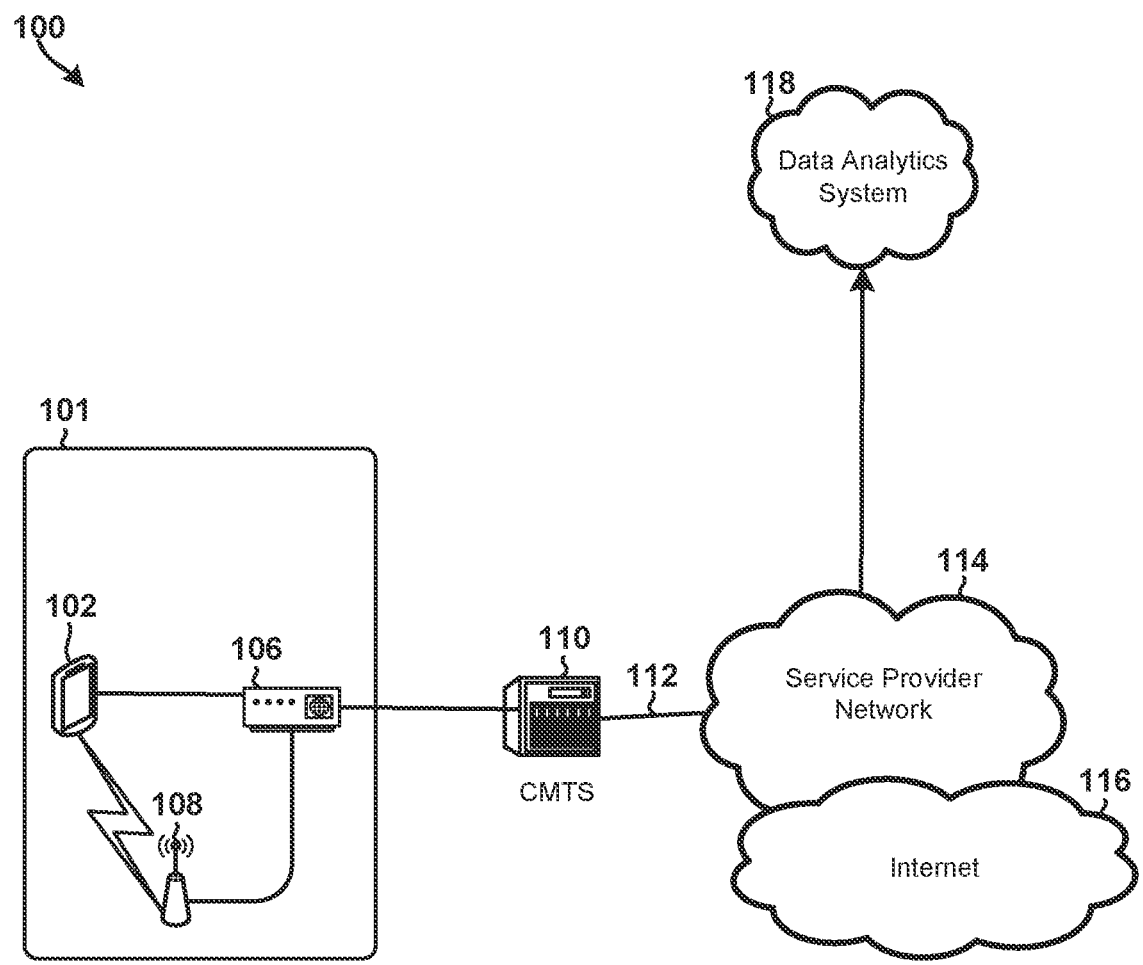
FIG. 1 is a system block diagram conceptually illustrating an example communications system suitable for use by various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, some embodiments include smart tap devices that are configured to alter the pre-equalization coefficients and/or RF communications from that which may be currently configured on the CMTS to a given CPE device in order to cause the given CPE device to alert the CMTS of impaired or altered operation. The smart tap devices (or another component in the network) may correlate the CPE device that reports the impaired or altered condition with that of the remote device configuration altering the RF communications so that a physical location of the given CPE device in question on the communications network may be determined. By knowing the physical communications network location, a physical address of the given CPE device may also be determined. The physical location and physical address of the CPE device may be used for troubleshooting network problems, locating compromised devices used in Theft-of-Service, as well as for aiding law-enforcement requests.

The term "service provider network" is used generically herein to refer to any network suitable for providing consumers with access to the Internet or IP services over broadband connections. Service provider networks may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-135/TDMA), evolution-data optimized (EV-DO), digital enhanced cordless telecommunications (DECT), Worldwide Interoperability for Microwave Access (WIMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "computing system" may be used generically herein to refer to any electronic device that includes a programmable processor, memory and circuitry for providing the functionality described herein. As such, a computing system may include any one or all of modems, routers, network switches, network bridges, residential gateways (RG), access nodes (AN), bridged residential gateway (BRG), fixed mobile convergence products, home networking adapters and Internet access gateways that enable consumers to access communications service providers' services, satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (for example, ROKU™) smart televisions, digital video recorders (DVRs), and similar electronic devices which include a programmable processor and memory and circuitry for providing the functionality described herein.

The term "user equipment (UE)" may be used herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The terms "theft of service device" and "TOS device" may be used interchangeably herein to refer to a device that allows a person or entity to obtain access to a network resource or service without lawfully compensating the service provider network.

The term "illegitimate device" is used herein to refer to a media access control (MAC) address or device (e.g., cable modem, etc.) that is not being used or operated in accordance with standards, policies or rules set forth by a service provider network. For example, an illegitimate device may be an unauthorized device that uses the resources or services of the service provider network without proper authorization from the service provider network and/or without lawfully compensating the service provider network. An illegitimate device may also be a device that is authorized to use the resources or services of the service provider network, but which has been hijacked or is otherwise not being used or operated in accordance with standards, policies or rules set forth by the service provider network.

A cable modem is a type of network bridge that provides bi-directional data communication via radio frequency channels on coaxial cable infrastructure, a hybrid fiber-coaxial (HFC), radio frequency over glass (RFoG) or other similar technologies. Cable modems are primarily used to deliver broadband Internet access in the form of cable Internet, taking advantage of the high bandwidth of a HFC or RFoG network. For ease of reference, some of the embodiments in this application are discussed with reference to a modem or cable modem. While the embodiments are particularly useful for identifying and responding to modems and other edge devices that register with a cable modem termination system (CMTS), it should be understood that the embodiments may apply to any type of computing system that uses IP connectivity. Therefore, the various embodiments disclosed in this application should not be limited in scope to modems or cable modems unless expressly recited.

Many subscribers connect to the Internet via a customer premise equipment (CPE) component/device. A CPE device may include a cable modem, digital subscriber line modem, router, switch, firewall, packet filter, wireless access point, and/or a residential gateway that provide network connectivity to home or small office network. In particular, a CPE device may allow UE devices on the local area network (LAN) to connect to a wide area network (WAN) and ultimately the Internet.

The various embodiments improve the performance, efficiency and functioning of the service provider network and the components/devices that are included in, utilize, or benefit from the service provider network.

FIG. 1 is a simplified example of a network 100 that may be used to implement the various embodiments. In the example illustrated in FIG. 1, the network 100 includes a local area network (LAN) 101 that includes user equipment (UE) 102 devices, a customer premise equipment (CPE) 106 component/device, and a wireless extender or access point 108. The UE 102 devices may be coupled to the CPE 106 component/device via wired and/or wireless communication links. The CPE 106 may include a cable modem (CM) that is coupled to a digital subscriber line access multiplexer (DSLAM) or a cable modem termination system (CMTS) 110. The CM in the CPE 106 component/device may be a network bridge that provides bi-directional data communication via radio frequency channels on a hybrid fiber-coaxial (HFC) and/or radio frequency over glass (RFoG) infrastructure.

The CMTS 110 may be configured to facilitate high speed communications between the CPE 106 and the components within a service provider network 114, which allow the UE 102 devices to send and receive information to and from the Internet 116. The CMTS 110 component may be deployed in a headend or hubsite which serves thousands of homes or LANs 101.

The service provider network 114 may include and/or may be coupled to a data analytics system 118 suitable or analyzing and storing information. The service provider network 114 may also include various network components for providing consumers with access to the Internet 116 or IP services over broadband connections. For example, the service provider network 114 may include a subscriber management component configured to store subscriber information and/or perform various subscription management operations, a policy component configured to determine and/or enforce various rules and policy decisions, a datacenter component, a virtual machine component, etc.

Figure 2:
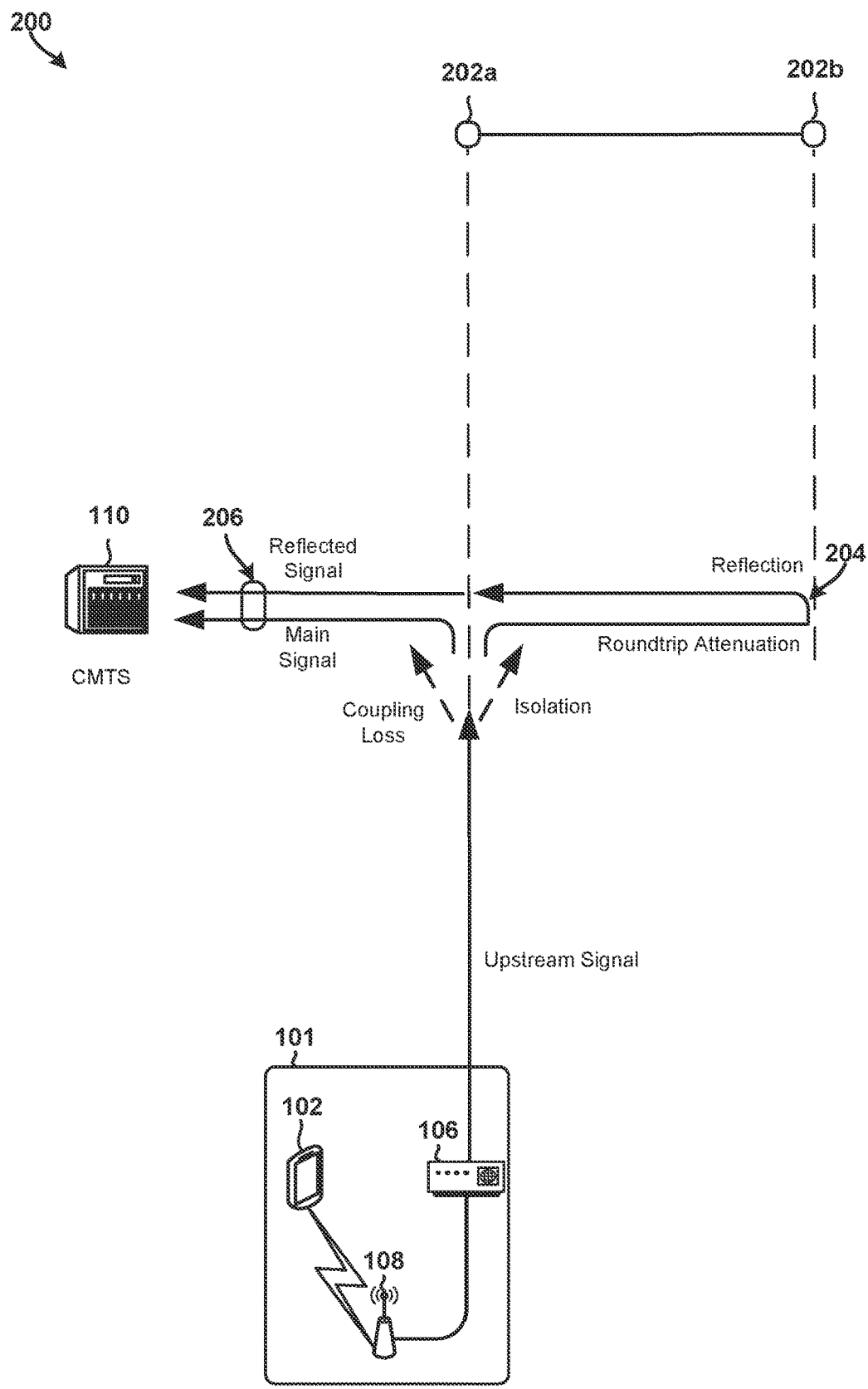
FIG. 2 is a system block diagram that illustrates impairments that could result from upstream communications between a CPE device and a CMTS.

FIG. 2 illustrates a system 200 in which the upstream communication signals between a CPE 106 and CMTS 110 are impaired. In the example illustrated in FIG. 2, the CPE 106 transmits a main RF signal in the upstream path towards the CMTS 110. As the signal propagates through the coaxial cable, the signal experiences a coupling loss, isolation, impedance mismatch, micro-reflection, etc. For example, corrosion on a center seizure screw where the coax cable enters an RF amplifier or a physical tap 202a may cause some of the RF energy from the CPE 106 to propagate on the downstream and eventually hit physical tap 202b. The physical tap 202b may include components that prevent upstream signals from passing on the downstream, which may cause the original signal to be reflected back towards the CMTS 110. As a result, the CMTS will receive an impaired signal 206 that includes both the main signal and a reflected signal.

To mitigate against such impairments, the CMTS 110 may be configured to evaluate the communication signals received from the CPE 106 to determine whether the signal is impaired and/or identify the cause (e.g., tilt, roll-off, in-channel standing waves, etc.) of an impairment (e.g., micro-reflections, group delay, etc.). The CMTS 110 may periodically inform or instruct the CPE 106 to pre-distort its signal to cancel out the effects of that impairment. For example, the CMTS 110 may instruct the CPE 106 to send a modified signal so that when pre-equalization data from the CPE 106 is received by the CMTS 110, the received signal is much closer to an ideal signal.

In some embodiments, the system 200 may also include DOCSIS proactive network maintenance (PNM) component that allows the service provider to identify faults before service is impacted for the subscriber at LAN 101. The PNM component may use pre-equalization data from CPEs 106 to identify upstream impairments (e.g., micro-reflections, group delay, etc.) that could impact service. The PNM component may evaluate the pre-equalization coefficients to identify the CMTS 110 components that include CPE 106 devices that are compensating for impairments like micro-reflections and group delay.

As mentioned above, a CMTS 110 may inform or instruct a CPE 106 to distort (or pre-distort) its signal to cancel out the effects of an impairment, and a PNM component may identify the CMTS 110 components that include CPE 106 devices that are compensating for impairments.

A single CMTS 110 may serve thousands of homes, LANs 101 or CPEs 106. Many service providers have visibility into the CMTS 110, but not the individual CPEs 106. Some service providers, such as multiple-system operators (MSOs), may have visibility into the CPEs 106, but not into which taps correlate with which CPEs 106. For these and other reasons, it may be challenging to identify the physical locations of specific CPEs 106 serviced by a CMTS 110 (e.g., based solely on the physical location of the CMTS 110, etc.).

Some embodiments may include smart tap devices, which may be configured to alter the pre-equalization coefficients and/or RF communications from that which is configured on the CMTS to a given CPE device. By altering the pre-equalization coefficients and/or RF communications, the smart tap devices may cause their corresponding CPE devices to alert their associated CMTS of impaired or altered operation. The smart tap devices (or another component in the network) may correlate the CPE device that reports the impaired or altered condition with that of the configuration of the remote device configuration altering the RF communications so that physical location of the CPE device in question on the communications network can be determined. By knowing the physical communications network location, a physical address may be determined. This can be useful for troubleshooting network problems, locating compromised devices used in Theft-of-Service, as well as for aiding law-enforcement requests.

Figure 3:
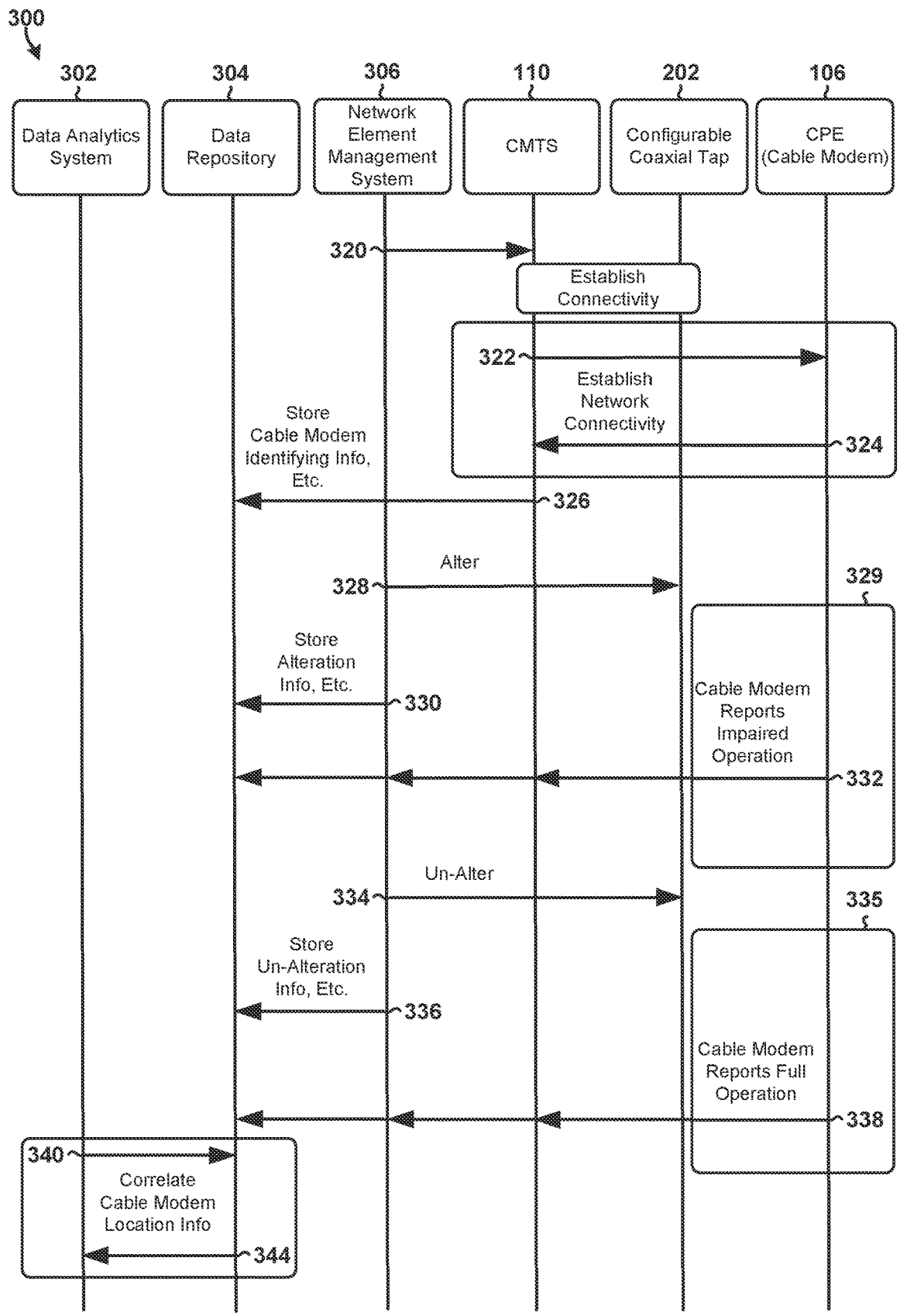
FIG. 3 is an activity diagram that illustrates the components, operations, and communications in a system configured to determine the location of a CPE device in accordance with an embodiment.

FIG. 3 illustrates an activity diagram of a system 300 configured to determine the physical location of a CPE 106 to within one hundred (100) or one hundred and fifty (150) feet. In the example illustrated in FIG. 3, the system 300 includes a data analytics system 302, a data repository 304, a network element management system (NEMS) 306, a CMTS 110, a configurable coaxial tap 202, and a given CPE 106.

In operation 320, the NEMS 306 may send a CMTS service group RF configuration to the CMTS 110. The CMTS service group RF configuration may include information identifying the characteristics of devices that share a common impairment. The NEMS 306 may poll the CMTS 110 to identify or evaluate all the modems that may be connected to the CMTS 110 and determine or evaluate the corresponding service group to which those modems are connected. Further, in some embodiments, the smart tap may include a modem that is configured to gather telemetry from the smart tap device. The smart tap modem may also be known to CMTS 110, and a correlation may be built as to CMTS service group →modems and smart taps. In some embodiments, as part of operation 320, the NEMS 306 may send a message to the smart tap to cause the smart tap to slightly impair one port at a time. The NEMS 306 may then re-poll the CMTS 110 to identify which modem has the corresponding impairment that was signaled to the smart tap. A new correlation may be built to show the relationship between the CMTS service group, smart tap identifier and the modem IP/MAC address. For example, the NEMS 306 may generate a modem to tap correlation information structure that includes information field/value that correlates a CMTS service group with a smart tap identifier and a modem IP/MAC address.

In operations 322 and 324, the CMTS 110 and CPE 106 may perform various operations to establish network connectivity.

In operation 326, the CMTS 110 may store information identifying the CPE 106 in the data repository 304.

In operation 328, the NEMS 306 may send an alteration request to the configurable coaxial tap 202 to alter the characteristics of the tap 202 and/or manipulate the RF characteristics of the CPE 106.

In some embodiments, the NEMS 306 may send the alteration request in response to determining that tap 202 has been installed and/or in response to determining that a new CPE 106 has come online via the tap 202. In some embodiments, the NEMS 306 may send the alteration request periodically (e.g. daily, weekly, monthly, etc.). In some embodiments, the NEMS 306 may send the alteration request based on utilization triggers. For example, the NEMS 306 may monitor bandwidth usage (e.g., via other components in the network) and/or set a bandwidth utilization trigger, and send the alteration request in response to detecting a trigger event or in response to determining that the bandwidth usage levels exceed a threshold value.

In operation 330, the NEMS 306 may store the alteration request or information regarding the alteration of the characteristics of the tap 202 in the data repository 304.

In operation block 329 and/or operation 332, the CPE 106 may commence detecting and reporting impaired operation to the CMTS 110, which may forward the reports to the NEMS 306 for storing in the data repository 304.

In operation 334, the NEMS 306 may send an un-alteration request to the configurable coaxial tap 202 to undo the alterations of the characteristics of the tap 202 and/or to correct or undo the manipulated RF characteristics of the CPE 106. By impairing the modem and returning the modem back to normal operation, the system may better verify that the modem to tap correlation is correct. The NEMS 306 system and/or the data analytics systems may track each occurrence to help validate the tap to modem correlation.

In operation 336, the NEMS 306 may store an un-alteration request and/or information regarding the un-alteration of the characteristics of the tap 202 in the data repository 304.

In operation block 335 and/or operation 338, the CPE 106 may commence reporting full/normal operation to the CMTS 110, which may forward the reports to the NEMS 306 for storing in the data repository 304.

In operations 340 and 344, the data analytics system 302 and data repository 304 may communicate and perform various operations to analyze the collected/stored information, generate or update modem-tap-port correlations, and store the generated/updated modem-tap-port correlations in memory. The information may be cross referenced with a theft of service analytics engine. The analytics engine may evaluate all the modem MAC information and DHCP information that is configured on the network in order to determine potential theft of service modems. The tap to modem correlation may be reference to identify the physical location of potential theft. If there is a law enforcement officer (LEO) order on a particular MAC/IP, the tap to modem correlation may be used in conjunction with billing information on the physical location. If that particular modem is theft of service, then the tap to modem correlation may be used to identify the physical location within 100-150 foot radius.

The modem-tap-port correlations may be used to identify, either by deduction or induction, the physical location of legitimate attached cable modems, as well as the rogue devices. The legitimate devices will have entries in the billing systems, whereas rogue devices will not. Cloned devices will show up as multiple entries in the Data Repository, but not in the billing system. These rogue devices may be isolated and located by using the tap-connector information with the physical (mailing or GPS address) of known good devices. Some additional processing, likely a combination of both computational and "analog" investigative techniques performed by humans will be needed to fill in the blanks. Periodic sweeps of the network could also be used to determine and locate bad actors that are using rogue devices that have altered the drop connection to change the connector on the configurable coaxial tap.

Unlike conventional solutions in which components in the service provider network may only determine the location of a CMTS that services a rogue or irregular CPE device, the various embodiment modem-tap-port correlations disclosed herein allow the components in the service provider network to determine the tap to which CPE device is attached. Since taps are typically dropped within 100-150 feet of the CPE device, rather than simply determining the general region/area (e.g., within 10, 15, 20, 30 miles) in which a rogue/irregular device operates, the embodiments allow the components in the service provider network to identify the street on which the CPE is located.

Figure 4:
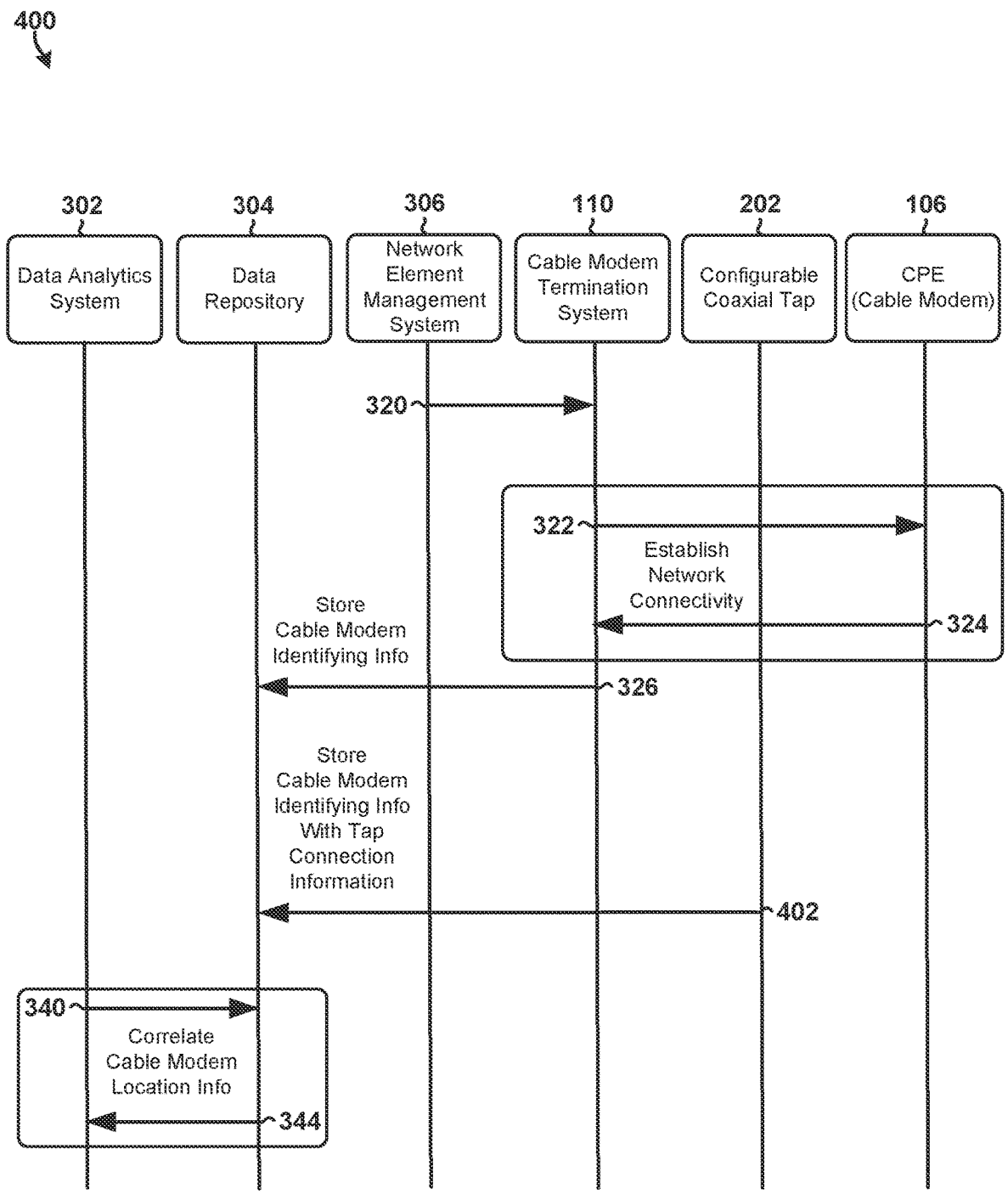
FIG. 4 is an activity diagram that illustrates the components, operations, and communications in an system configured to determine the location of a CPE device in accordance with another embodiment.

FIG. 4 illustrates an activity diagram of alternative operations in a system 400 configured to determine the physical location of a CPE 106 to within one hundred (100) or one hundred and fifty (150) feet. In the example illustrated in FIG. 4, the system 400 includes a data analytics system 302, a data repository 304, a network element management system (NEMS) 306, a CMTS 110, a configurable coaxial tap 202, and a CPE 106. The configurable coaxial tap 202 may include a modulator-demodulator and/or a packet sniffer/decoder.

With reference to FIGS. 3 and 4, in operations 320-326, the system may perform the same operations discussed above with reference to FIG. 3. In operation 402, the configurable coaxial tap 202 may store information identifying the CM/CPE 106 along with tap connection information in the data repository 304. In operations 340 and 344, the data analytics system 302 and the data repository 304 may communicate and perform various operations to analyze the collected/stored information, generate or update modem-tap-port correlations, and store the generated/updated modem-tap-port correlations in memory. Modulating and/or demodulating and packet sniffing at the tap may provide operators another point in the network to execute LEO orders on packet interception.

Figure 5:
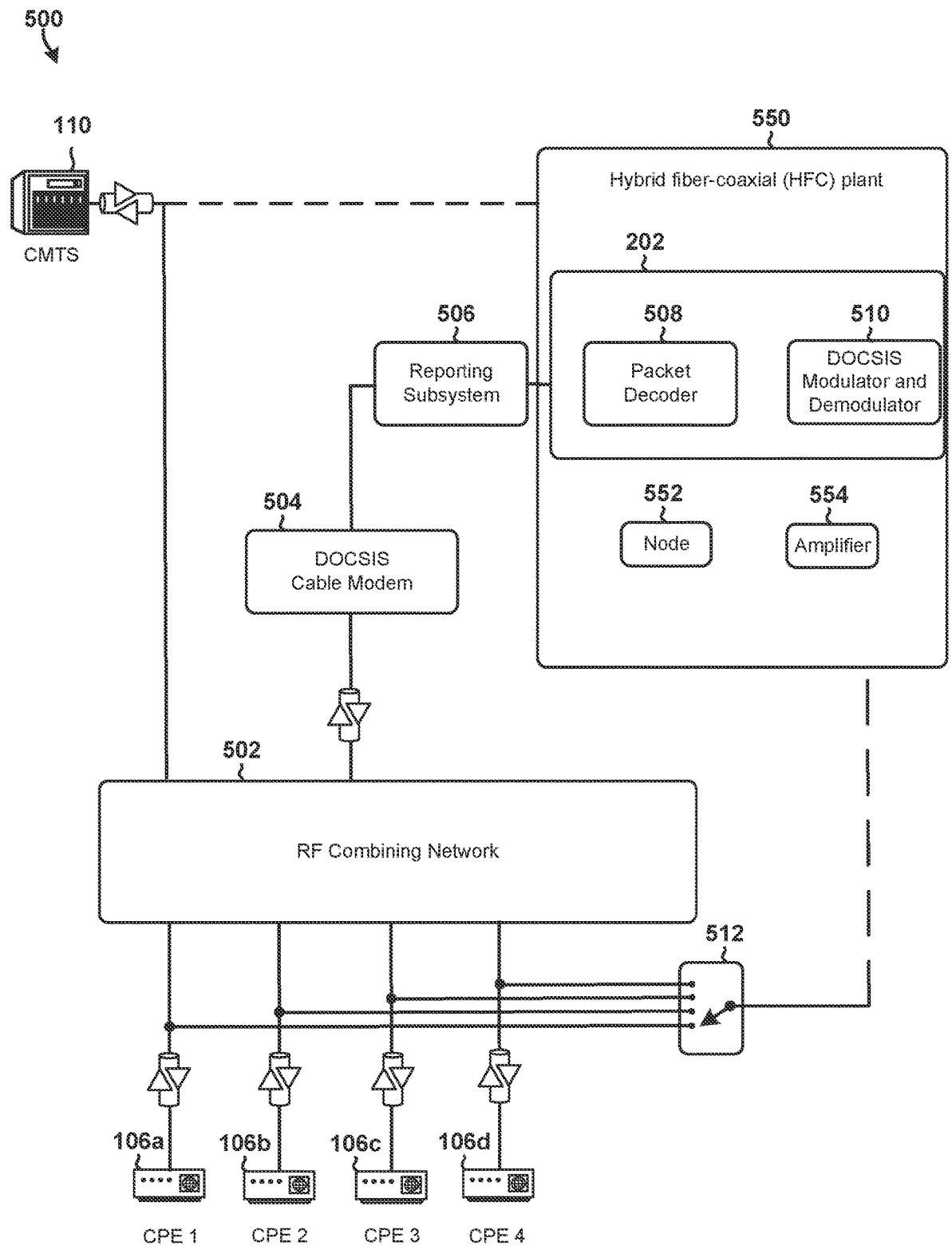
FIG. 5 is a system block diagram that illustrates a system that includes a smart tap equipped with a packet decoder and a modulator-demodulator in accordance with some embodiments.

FIG. 5 illustrates a system 500 that may be configured to perform the operations discussed above with reference to FIG. 4. In the example illustrated in FIG. 5, the system 500 includes a plurality of CPE devices 106a-106d, a CMTS 110, configurable coaxial tap 202, an RF combining network 502, and a DOCSIS cable modem 504. The configurable coaxial tap 202 may include a reporting subsystem 506, a packet decoder 508, and a DOCSIS modulator and demodulator 510. The reporting subsystem 506 may be communicatively coupled to the DOCSIS cable modem 504. The RF combining network 502 may be communicatively coupled to the plurality of CPE devices 106a-106d, DOCSIS cable modem 504, and CMTS device 110. The plurality of CPE devices 106a-106d may be coupled to the DOCSIS modulator and demodulator 510 via a switch 512.

In some embodiments, the reporting subsystem 506 may be included within or communicatively coupled to a data center (e.g., regional data center, etc.) or backoffice. In some embodiments, the configurable tap 202 may be communicatively coupled to the reporting subsystem 506 and/or backoffice where data could be stored for further analytical analysis.

The DOCSIS modulator and demodulator 510 may include modulators, such as an Analog to Digital Converter (ADC) and/or a Digital to Analog Converter (DAC), that modulate/demodulate the signal. This allows the packet coder 508 or DOCSIS analyzer to decode the DOCSIS frame and header to read the device's MAC and IP address.

In some embodiments, from the CMTS 110 within a headend, there may be a RF combining network 502 to transmitter/receivers to a node 552 that is part of a hybrid fiber-coaxial (HFC) plant 550. Logically behind the node, there may be amplifiers 554 and taps (e.g., configurable coaxial tap 202). Each tap port may be communicatively coupled to DOCSIS cable modem 504 and/or CPE devices 106a-d.

Figure 6:
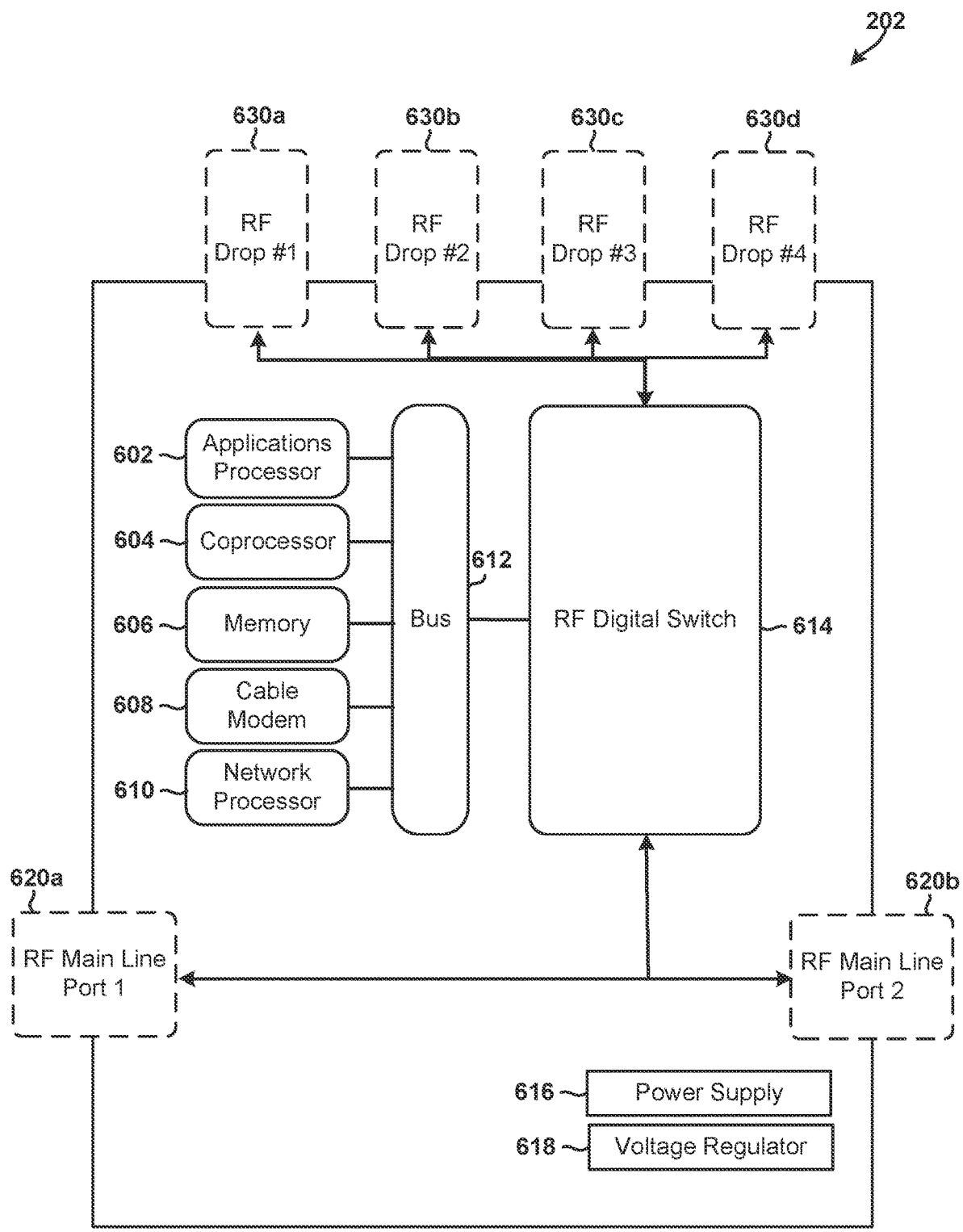
FIG. 6 illustrates an example architecture of a configurable coaxial tap suitable for implementing the various embodiments.

FIG. 6 illustrates an example architecture of a configurable coaxial tap 202 suitable for implementing the various embodiments. The configurable coaxial tap 202 may include an application processor 602, a coprocessor 604, memory 606, a cable modem 608, a network processor 610, an interconnection/bus component 612, a radio frequency (RF) digital switch 614, a power supply 616 and a voltage regulator 618.

In the example illustrated in FIG. 6, the configurable coaxial tap 202 includes two radio frequency (RF) main line ports 620a, 620b (also sometime called "trunk ports") and four RF drop ports 630a-630d. In some embodiments, the configurable coaxial tap 202 may include four (4) different RF main line ports (trunk ports).

The ports 620a, 620b may attach to the hard line of the hybrid fiber-coaxial (HFC) plant and/or feed other configurable coaxial taps in cascade. The RF drop ports 630a-630d may service up to four homes directly, typically up to 150 feet.

The configurable coaxial tap 202 may be configured to remotely monitor all of the ports 620a-630d both in the upstream and downstream frequencies. Through software, each ports 620a-630d may have a dynamic filter and/or the ability to filter out unwanted ingress. Because each port 620a-630d is connected to the RF digital switch 614, each port 620a-630d may have a power spectral density threshold set on each port 620a-630d and each port 620a-630d may have the ability to frequency shift from input to output. The digital switch 614 may also perform amplification, so that the entire HFC plant would not require traditional amplification.

The interconnection/bus component 612 which may include an array of reconfigurable logic gates and/or implement a bus architecture (e.g., CoreConnect, AMBA, etc.). Communications may also be provided by advanced interconnects, such as high performance networks-on chip (NoCs).

In addition to the components illustrated in FIG. 6, the configurable coaxial tap 202 may include analog circuitry and custom circuitry for managing sensor data, wireless data transmissions, and for performing other specialized operations, such as processing IP data packets. The configurable coaxial tap 202 may include system components and resources, such as a power supply 616, a voltage regulator 618, oscillators, phase-locked loops, peripheral bridges, data controllers, memory controllers, system controllers, access ports, timers, and other similar components used to support the processors and software clients (e.g., a web browser) running on a computing device. The configurable coaxial tap 202 may include an input/output module for communicating with external resources and/or include circuitry to interface with peripheral devices, such as electronic displays, wireless communication devices, external memory chips, etc.

Each of the processors (e.g., processors 602, 604, 608, 610, etc.) may include one or more cores, and each processor/core may perform operations independent of the other processors/cores. For example, in some embodiments, the network processor may include a packet processor (e.g., P4 programmable packet processor) suitable for processing IP data packets. In some embodiments, the processors may be implemented via an application specific integrated circuits (ASIC). In some embodiments, the processors may be implemented via a customized integrated circuit (IC) (e.g., customized for a particular routing use, etc.).

In addition to the configurable coaxial tap 202 discussed above, the various embodiments may be implemented in a wide variety of computing systems, which may include a single processor, multiple processors, multicore processors, or any combination thereof.

Figure 7:
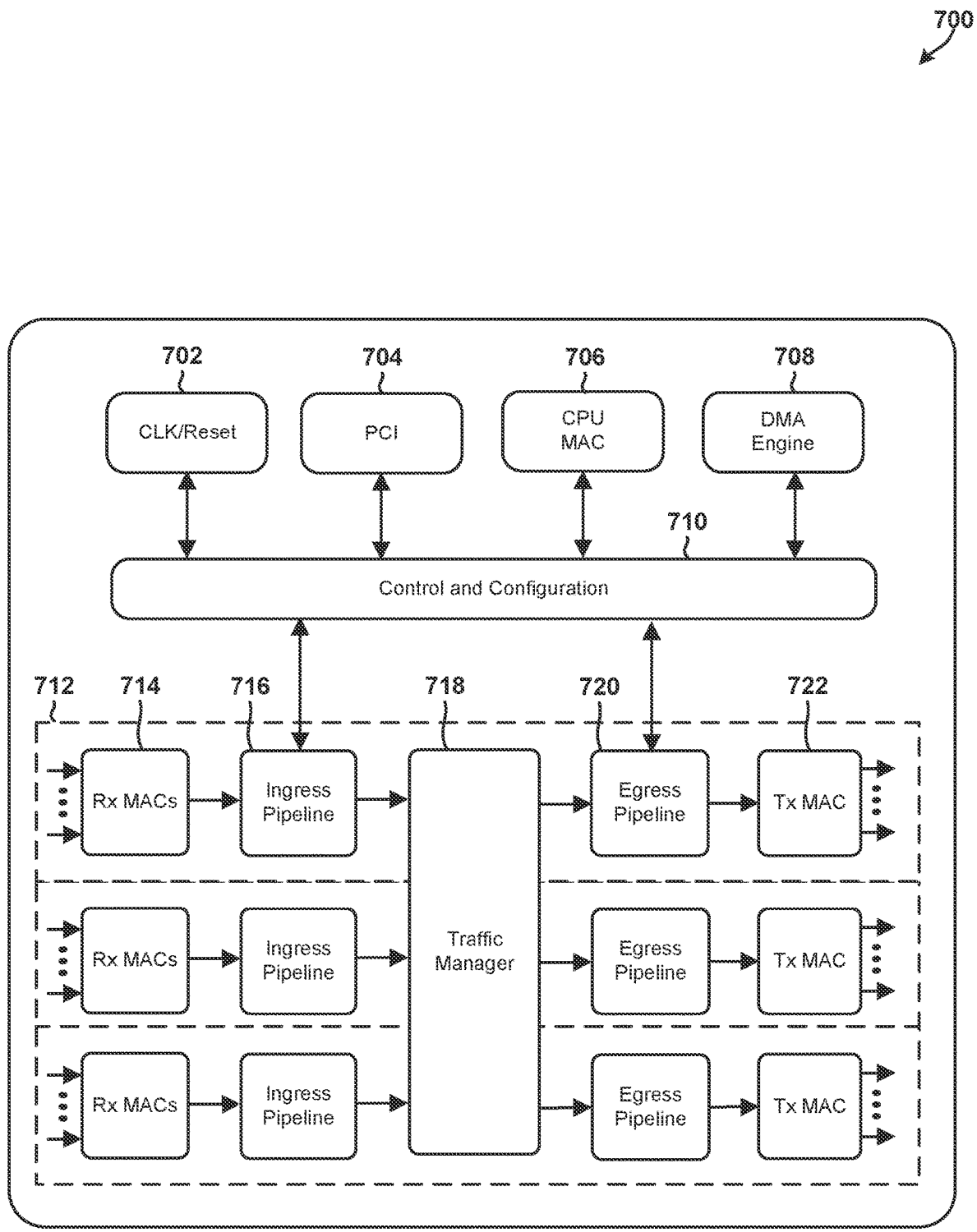
FIG. 7 is a component diagram of example computing systems that suitable for implementing the various embodiments.

FIG. 7 illustrates an example system 700 architecture that may be used in network components (e.g., configurable coaxial tap 202, network element management system 306, etc.) configured in accordance with various embodiments. In the example illustrated in FIG. 7, the system 700 includes a clock/reset component 702, a peripheral component interconnect (PCI) component 704, a central processing unit (CPU) media access control (MAC) component 706, a direct memory access (DMA) engine component 708, and a control and configuration component 710. The system 700 includes a plurality of processing blocks 712 that implement a switch architecture that could be partitioned and/or controlled by the various embodiments. In the illustrated example, the processing blocks 712 each include or utilize a receiver MACs component 714, an ingress pipeline component 716, a traffic manager component 718, an egress pipeline component 720, and a transmission MAC component 722.

Figure 8A:
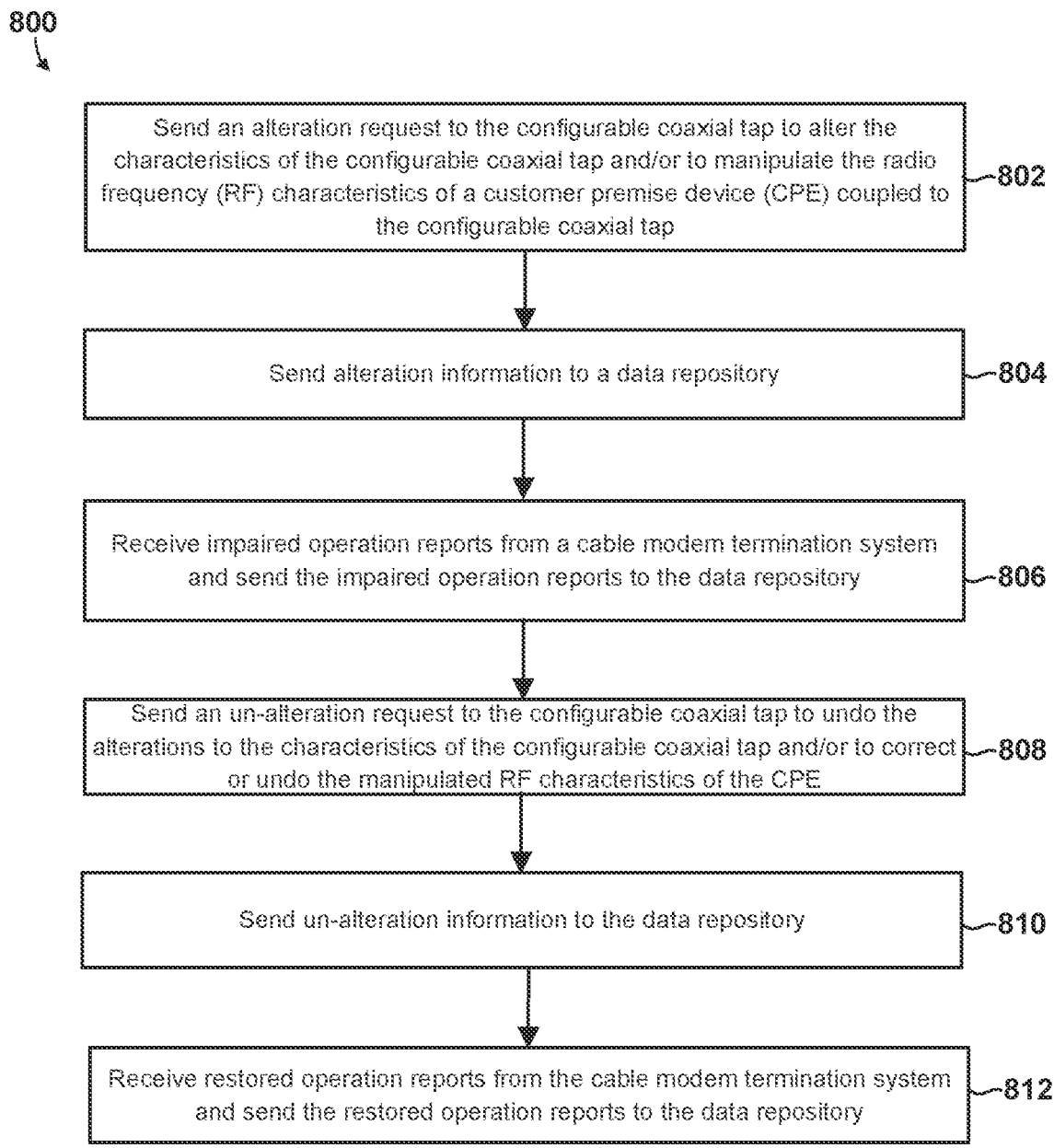
FIGS. 8A and 8B are process flow diagrams illustrating methods of determining the location of a CPE device in accordance with some embodiments.
Figure 8B:
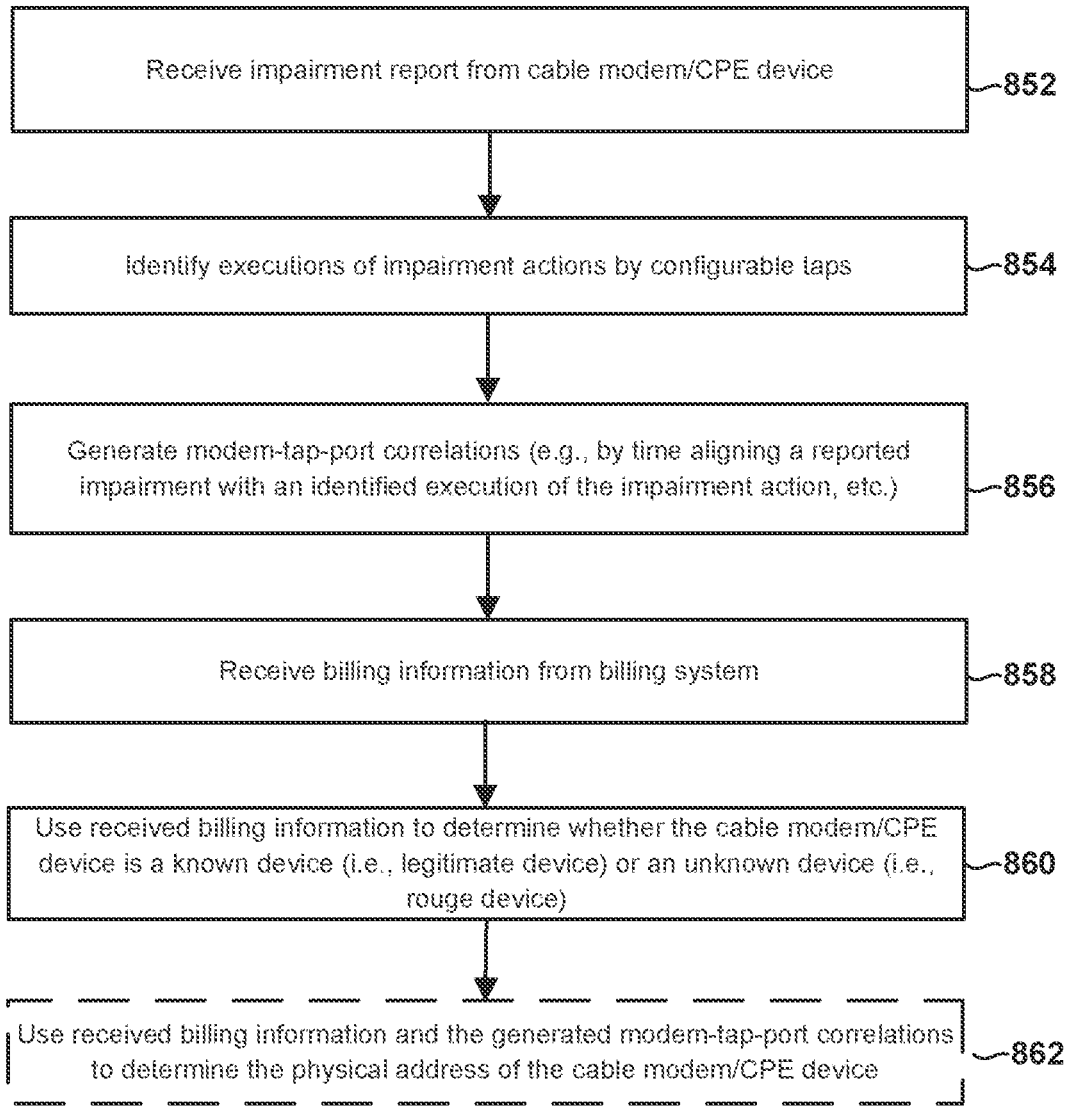

FIGS. 8A and 8B illustrate methods 800, 850 that may be performed by one or more components (e.g., smart configurable coaxial tap 202 and/or a network element management system 306, etc.) to determine the location of a CPE device in accordance with some embodiments.

With reference to FIG. 8A, in block 802, a component (e.g., network element management system 306) may send an alteration request to the configurable coaxial tap to alter the characteristics of the configurable coaxial tap 202 and/or to manipulate the radio frequency (RF) characteristics of a customer premise device (CPE) 106 coupled to the configurable coaxial tap 202. In some embodiments, in block 802, the component may send the alteration request to a configurable coaxial tap that includes a radio frequency modulator-demodulator combination, and the alteration request may cause the configurable coaxial tap to directly examine packets that are sent to or received from the CPE device.

In block 804, the component may send alteration information to a data repository 304. In block 806, the component may receive impaired operation reports from a cable modem termination system 110 and send/relay the received impaired operation reports to the data repository 304. In block 808, the component may send an un-alteration request (i.e., 334) to the configurable coaxial tap 202 to undo the alterations to the characteristics of the configurable coaxial tap and/or to correct or undo the manipulated RF characteristics of the CPE 106. In block 810, the component may send un-alteration information (i.e., 336) to the data repository 304. In block 812, the component may receive restored operation reports from the cable modem termination system 110 and send the restored operation reports to the data repository 304.

With reference to FIG. 8B, in block 852, a component may receive an impairment report from a cable modem or a customer premise device (CPE) 106. In block 854, the component may identify executions of impairment actions by configurable taps 202. In block 856, the component may generate modem-tap-port correlations, such as by time aligning a reported impairment with an identified execution of the impairment action. In some embodiments, the component may generate the modem-tap-port correlations based on any or all of information identifying the CPE 106, alteration information, impaired operation reports, un-alteration information, and/or restored operation reports.

In block 858, the component may receive billing information from the billing system. In block 860, the component may use received billing information to determine whether the cable modem/CPE device 106 is a known device (i.e., legitimate device) or an unknown device (i.e., rouge device). In optional block 862, the component may use received billing information and the generated modem-tap-port correlations to determine the physical address of the cable modem/CPE device 106.

In some embodiments, the configurable coaxial tap 202 may be configured to create an impairment (e.g., micro-reflections, group delay, etc.) scenario. In some embodiments, this may be accomplished by lowering transmit levels, for example, so the modem will need to "step down" in modulation order. In other embodiments, this may be accomplished by blocking some subset of OFDM subcarriers to impair performance, etc. In some embodiments, the configurable coaxial tap 202 may be configured to create the impairment in response to receiving an alteration request (e.g., as part of the operations in block 802, etc.).

In some embodiments, the network element management system 306 may be augmented with functionally that allows it to be able to address, configure, and control the tap devices (e.g., the configurable coaxial tap 202, etc.).

In some embodiments, the network element management system 306 may be configured to control the radio frequency (RF) performance characteristics of the smart tap (configurable coaxial tap 202) to reveal the physical location of the attached device (e.g., as part of the operation in block 862, etc.). In some embodiments, the smart-tap may include a RF modulator-demodulator combination that could be used to directly examine the packets sent and received from a target cable modem. This may be used to determine the connected port, but can also be used as a direct monitoring device suitable for legal-intercept purposes.

In some embodiments, the network element management system 306 may be configured to coordinate the scheduling of the impairments.

In some embodiments, the system may further include a data repository that is configured to store the scheduling and reports of the impairments.

In some embodiments, the system may further include a data analytics system configured to analyze logs, files, memories, etc. that store the impairment(s) being set/reported/unset/unreported.

In some embodiments, each CMTS may include one or more CMTS ports. Each CMTS port may include one or more configurable coaxial taps 202. Each configurable coaxial tap 202 may include one or more tap ports.

In some embodiments, the system may be configured so that for each tap port of each tap of each CMTS port of each CMTS, the system aligns the cable modem reporting impairment issue that is time-aligned with the execution of the impairment action by the configurable coaxial tap 202. This may need to be repeated continuously or multiple time so as to settle out simultaneous legitimate impairments, perhaps using differing impairment scenarios. Additionally, the data analytics system may correlate with a billing system to locate known versus unknown devices as well as correlation with physical addresses.

Figure 8C:
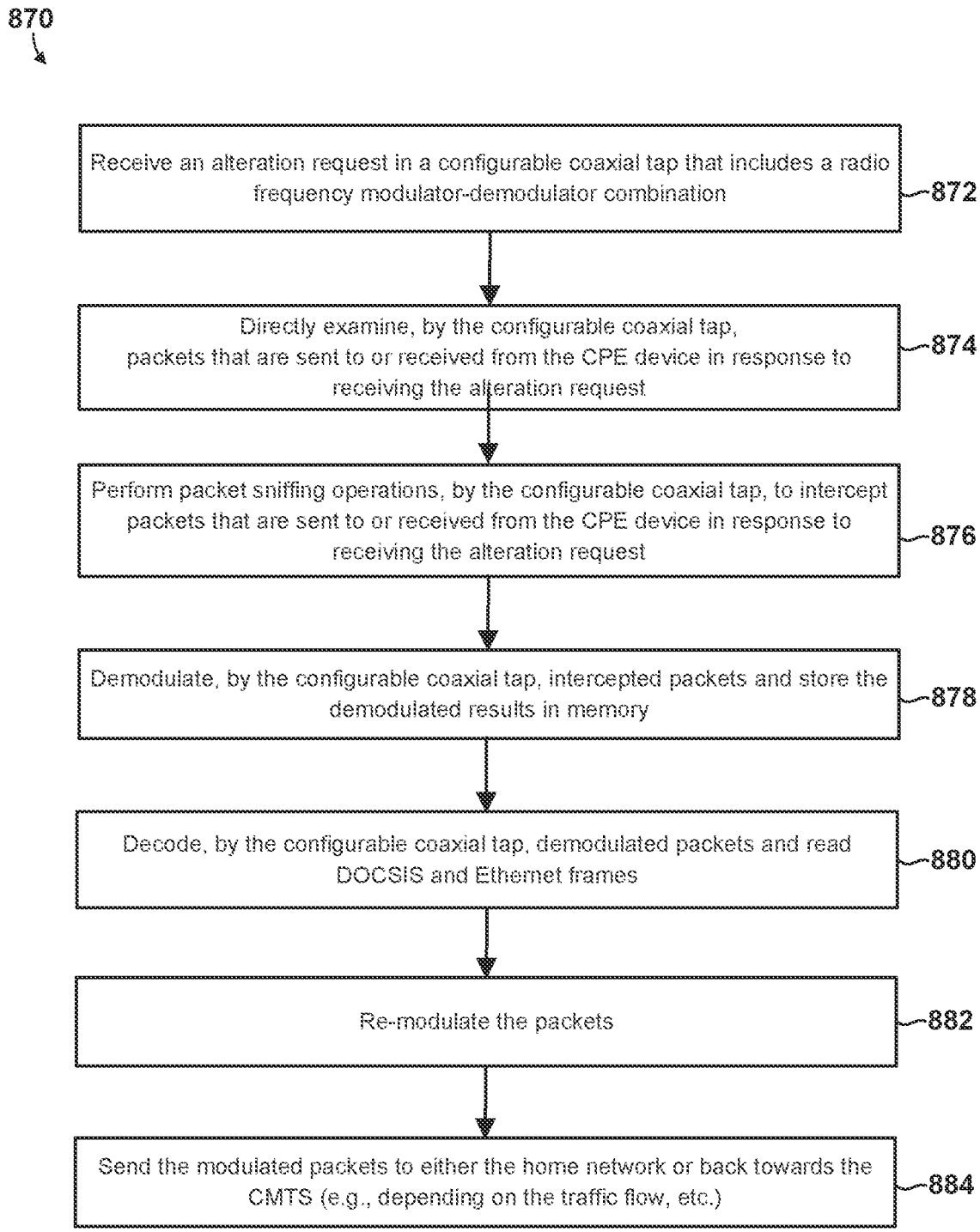
FIG. 8C is a process flow diagram illustrating a method of evaluating a CPE device in accordance with some embodiments.

FIG. 8C illustrates a method 870 of evaluating a CPE device in accordance with some embodiments. Method 870 may be performed by any or all of the components (e.g., smart configurable coaxial tap 202, a network element management system 306, etc.) discussed in this application.

In block 872, a configurable coaxial tap 202 that includes a radio frequency modulator-demodulator combination may receive an alteration request from a network element management system 306. Alternatively or in addition, in block 872, a processor in the network element management system 306 may send an alteration request to a configurable coaxial tap 202 that includes a radio frequency modulator-demodulator combination. In some embodiments, the alteration request may include information suitable for causing the configurable coaxial tap 202 to directly examine packets that are sent to or received from the CPE device.

In response to receiving the alteration request, in block 874 the configurable coaxial tap 202 may directly examine packets that are sent to or received from the CPE device. In block 876 the configurable coaxial tap 202 may perform packet sniffing operations to intercept packets that are sent to or received from the CPE device. In block 878, the configurable coaxial tap 202 may demodulate intercepted packets and store the demodulated results in memory. In block 880, the configurable coaxial tap 202 may decode demodulated packets and read DOCSIS and Ethernet frames. In block 882, the configurable coaxial tap 202 may re-modulate the packets. In block 884, the configurable coaxial tap 202 may send the modulated packets to either the home network or back towards the CMTS (e.g., depending on the traffic flow, etc.).

That is, because there is a modulator/demodulator inside the configurable coaxial tap 202, the entire RF spectrum may be demodulated (e.g., in blocks 874-878, etc.) and sent to the packet decoder in order to read the DOCSIS and Ethernet frames (e.g., in block 880, etc.). After inspection the packets are modulator, and sent either to the home or back towards the CMTS depending on the traffic flow (e.g., in block 884, etc.).

Conventional taps typically do not include compute, modulator/demodulators or packet decoders within them. As a result, conventional solutions may not perform the operations of method 870 at the configurable coaxial tap 202. Rather, they are limited to implementing any such functional back at the headend either in the CMTS or just north of the CMTS.

In addition, because conventional taps do not include an RF modulator, there isn't a way to inspect the traffic flow. These conventional devices are simply passive devices with no intelligence within them.

There are number of benefits to the various embodiments disclosed herein that include a radio frequency modulator-demodulator combination and/or a packet decoder in a configurable coaxial tap. For example, including such components in a tap allow for positively identifying the device in the home without having to manipulate the RF characteristics between the device. By manipulating the RF, there is a chance of slightly impacting performance of the customer. However there may be a potential impact by mod/demod and packet inspecting in the tap too, which could potentially increase latency for the packet. In addition, by mod/demodulating at the configurable coaxial tap, the RF signal may be regenerated. This may result in a signal having a high fidelity signal coming out of the tap. With a higher fidelity signal, higher order modulation profiles may be run to the modem.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the method 800 may be substituted for or combined with one or more operations of the method 850, and vice versa.

Figure 9:
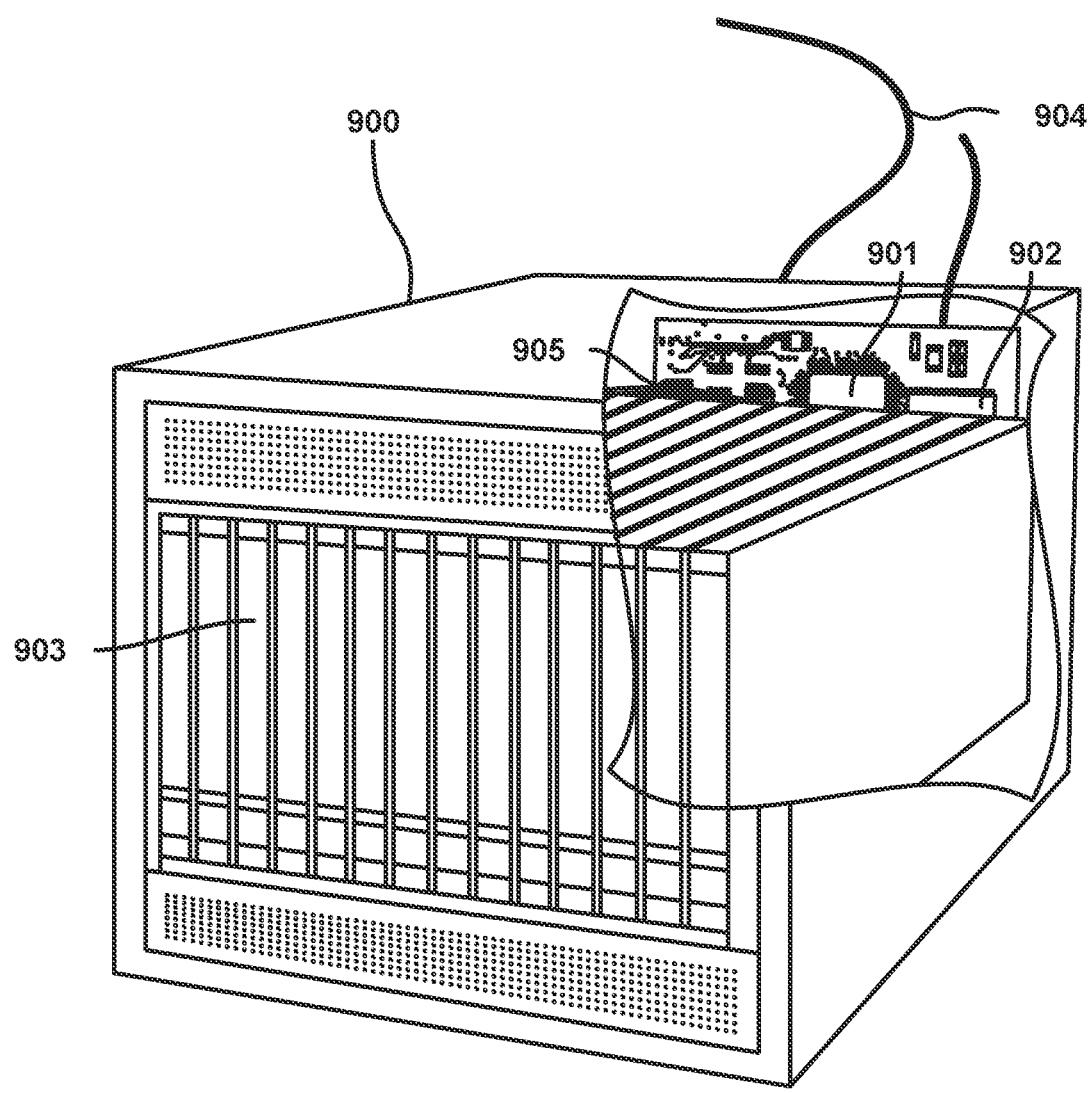
FIG. 9 is a component diagram of an example computing system suitable for implementing the various embodiments.

Various embodiments (including, but not limited to, embodiments discussed above with reference to FIGS. 1A-8B) may be implemented on any of a variety of commercially available computing devices, such as the computing device 900 illustrated in FIG. 9. Such a computing device 900 may include a processor 901 coupled to volatile memory 902 and a large capacity nonvolatile memory, such as a disk drive 903. The computing device 900 may also include network access ports 906 coupled to the processor 901 for establishing data connections with a network connection circuit 904 and a communication network (e.g., IP network) coupled to other communication system network elements.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

Referring to FIGS. 1-9 and according to various embodiments of the present disclosure, a method of evaluating a customer premise equipment (CPE) device may be provided. An embodiment method may include the steps of receiving an alteration request in a configurable coaxial tap that includes a radio frequency modulator-demodulator combination; and evaluating the CPE by the configurable coaxial tap directly examining packets that are sent to or received from the CPE device in response to the configurable coaxial tap receiving the alteration request.

In an embodiment, the method of evaluating a CPE may further include the step of performing, by the configurable coaxial tap, packet sniffing operations to intercept packets that are sent to or received from the CPE device. In an embodiment, the method of evaluating a CPE may further include the step of demodulating, by the configurable coaxial tap, intercepted packets and storing the results in a memory. In an embodiment, the method of evaluating a CPE may further include the step of decoding, by the configurable coaxial tap, demodulated packets and read data over cable service interface specification (DOCSIS) and Ethernet frames. In an embodiment, the method of evaluating a CPE may further include the steps of remodulating the packets; and sending the remodulated packets to at least one or more of: a home network that includes the CPE; or a cable modem termination system (CMTS). In an embodiment method, sending the remodulated packets to at least one or more of the home network that includes the CPE or the CMTS may include: determining whether to send the remodulated packets to the home network or to the CMTS based on traffic flow; and sending the remodulated packets the home network or to the CMTS based on a result of the determination.

Referring to FIGS. 1-9 and according to various embodiments of the present disclosure, a configurable coaxial tap may be provided that includes: a radio frequency modulator-demodulator combination; and a processor coupled to the radio frequency modulator-demodulator combination, where the processor is configured with processor-executable software instructions to: receive an alteration request; and evaluate a customer premise equipment (CPE) by directly examining packets that are sent to or received from the CPE device in response receiving the alteration request.

In an embodiment, the processor may be configured to perform packet sniffing operations to intercept packets that are sent to or received from the CPE device. In another embodiment, the processor may be configured to demodulate intercepted packets and store the results in a memory. In another embodiment, the processor may be configured to decode the demodulated packets and read data over cable service interface specification (DOCSIS) and Ethernet frames. In another embodiment, the processor may be configured to: remodulate the packets; and send the remodulated packets to at least one or more of: a home network that includes the CPE; or a cable modem termination system (CMTS). In another embodiment, the processor may be configured to send the remodulated packets to at least one or more of the home network or to the CMTS by: determining whether to send the remodulated packets to the home network or to the CMTS based on traffic flow; and sending the remodulated packets the home network or to the CMTS based on a result of the determination.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of evaluating a customer premise equipment (CPE) device, comprising:
   receiving, in a configurable coaxial tap that includes a radio frequency modulator-demodulator combination, an alteration request;
   directly examining, in the configurable coaxial tap, packets that are sent to or received from the CPE device in response to the configurable coaxial tap receiving the alteration request;
   detecting, in the configurable coaxial tap, an impairment of the CPE by analyzing deviations in pre-equalization coefficients beyond predetermined thresholds;
   executing an impairment action by causing, by the configurable coaxial tap, the CPE to pre-distort an associated signal to cancel out the effects of the impairment, wherein the pre-distortion is dynamically adjusted based on a severity of detected impairment; and
   generating a modem-tap-port correlation by time aligning the detected impairment with an identified execution of the impairment action.

2. The method of claim 1, further comprising performing, by the configurable coaxial tap, packet sniffing operations to intercept packets that are sent to or received from the CPE device.

3. The method of claim 2, further comprising demodulating, by the configurable coaxial tap, intercepted packets and storing the results in a memory.

4. The method of claim 3, further comprising decoding, by the configurable coaxial tap, demodulated packets and read data over cable service interface specification (DOCSIS) and Ethernet frames.

5. The method of claim 4, further comprising:
   remodulating the packets; and
   sending the remodulated packets to at least one or more of:
   a home network that includes the CPE; or
   a cable modem termination system (CMTS).

6. The method of claim 5, wherein sending the remodulated packets to at least one or more of the home network that includes the CPE or the CMTS comprises:
   determining whether to send the remodulated packets to the home network or to the CMTS based on traffic flow; and
   sending the remodulated packets the home network or to the CMTS based on a result of the determination.

7. A configurable coaxial tap, comprising
   a radio frequency modulator-demodulator combination; and
   a processor coupled to the radio frequency modulator-demodulator combination, where the processor is configured with processor-executable software instructions to:

receive an alteration request;
directly examine packets that are sent to or received from a customer premise equipment (CPE) device in response to receiving the alteration request;
detect an impairment of the CPE by analyzing deviations in pre-equalization coefficients beyond predetermined thresholds;
execute an impairment action by causing the CPE to pre-distort an associated signal to cancel out the effects of the impairment, wherein the pre-distortion is dynamically adjusted based on a severity of detected impairment; and
generate a modem-tap-port correlation by time aligning the detected impairment with an identified execution of the impairment action.

8. The configurable coaxial tap of claim 7, wherein the processor is configured to perform packet sniffing operations to intercept packets that are sent to or received from the CPE device.

9. The configurable coaxial tap of claim 8, wherein the processor is configured to demodulate intercepted packets and store the results in a memory.

10. The configurable coaxial tap of claim 9, wherein the processor is configured to decode the demodulated packets and read data over cable service interface specification (DOCSIS) and Ethernet frames.

11. The configurable coaxial tap of claim 10, wherein the processor is configured to:
  remodulate the packets; and
  send the remodulated packets to at least one or more of:
    a home network that includes the CPE; or
    a cable modem termination system (CMTS).

12. The configurable coaxial tap of claim 11, wherein the processor is configured to send the remodulated packets to at least one or more of the home network or to the CMTS by:
  determining whether to send the remodulated packets to the home network or to the CMTS based on traffic flow; and
  sending the remodulated packets the home network or to the CMTS based on a result of the determination.

13. A non-transitory computer readable storage medium having stored thereon processor-executable software instructions configured to cause a processor in a configurable coaxial tap that includes a radio frequency modulator-demodulator combination to perform operations for evaluating a customer premise equipment (CPE) device, the operations comprising:
  receiving an alteration request;
  directly examining packets that are sent to or received from the CPE device in response to receiving the alteration request;
  detecting an impairment of the CPE by analyzing deviations in pre-equalization coefficients beyond predetermined thresholds;
  executing an impairment action by causing the CPE to pre-distort an associated signal to cancel out the effects of the impairment, wherein the pre-distortion is dynamically adjusted based on a severity of detected impairment; and
  generating a modem-tap-port correlation by time aligning the detected impairment with an identified execution of the impairment action.

14. The non-transitory computer readable storage medium of claim 13, wherein the stored processor-executable software instructions are configured to cause the processor to perform operations further comprising performing packet sniffing operations to intercept packets that are sent to or received from the CPE device.

15. The non-transitory computer readable storage medium of claim 14, wherein the stored processor-executable software instructions are configured to cause the processor to perform operations further comprising demodulating intercepted packets and storing the results in a memory.

16. The non-transitory computer readable storage medium of claim 15, wherein the stored processor-executable software instructions are configured to cause the processor to perform operations further comprising decoding demodulated packets and read data over cable service interface specification (DOCSIS) and Ethernet frames.

17. The non-transitory computer readable storage medium of claim 16, wherein the stored processor-executable software instructions are configured to cause the processor to perform operations further comprising:
  remodulating the packets; and
  sending the remodulated packets to at least one or more of:
    a home network that includes the CPE; or
    a cable modem termination system (CMTS).

18. The non-transitory computer readable storage medium of claim 17, wherein the stored processor-executable software instructions are configured to cause the processor to perform operations such that sending the remodulated packets to at least one or more of the home network that includes the CPE or the CMTS comprises:
  determining whether to send the remodulated packets to the home network or to the CMTS based on traffic flow; and
  sending the remodulated packets the home network or to the CMTS based on a result of the determination.

* * * * *